3,438,657
SWAGED FERRULE TYPE FLEXIBLE COUPLING
Jorge Torres, Los Angeles, Calif., assignor to Purolator
 Products, Inc., Rahway, N.J., a corporation of Delaware
Filed Jan. 25, 1967, Ser. No. 611,616
Int. Cl. F16l 21/00, 19/00, 21/02, 33/18
U.S. Cl. 285—233       10 Claims

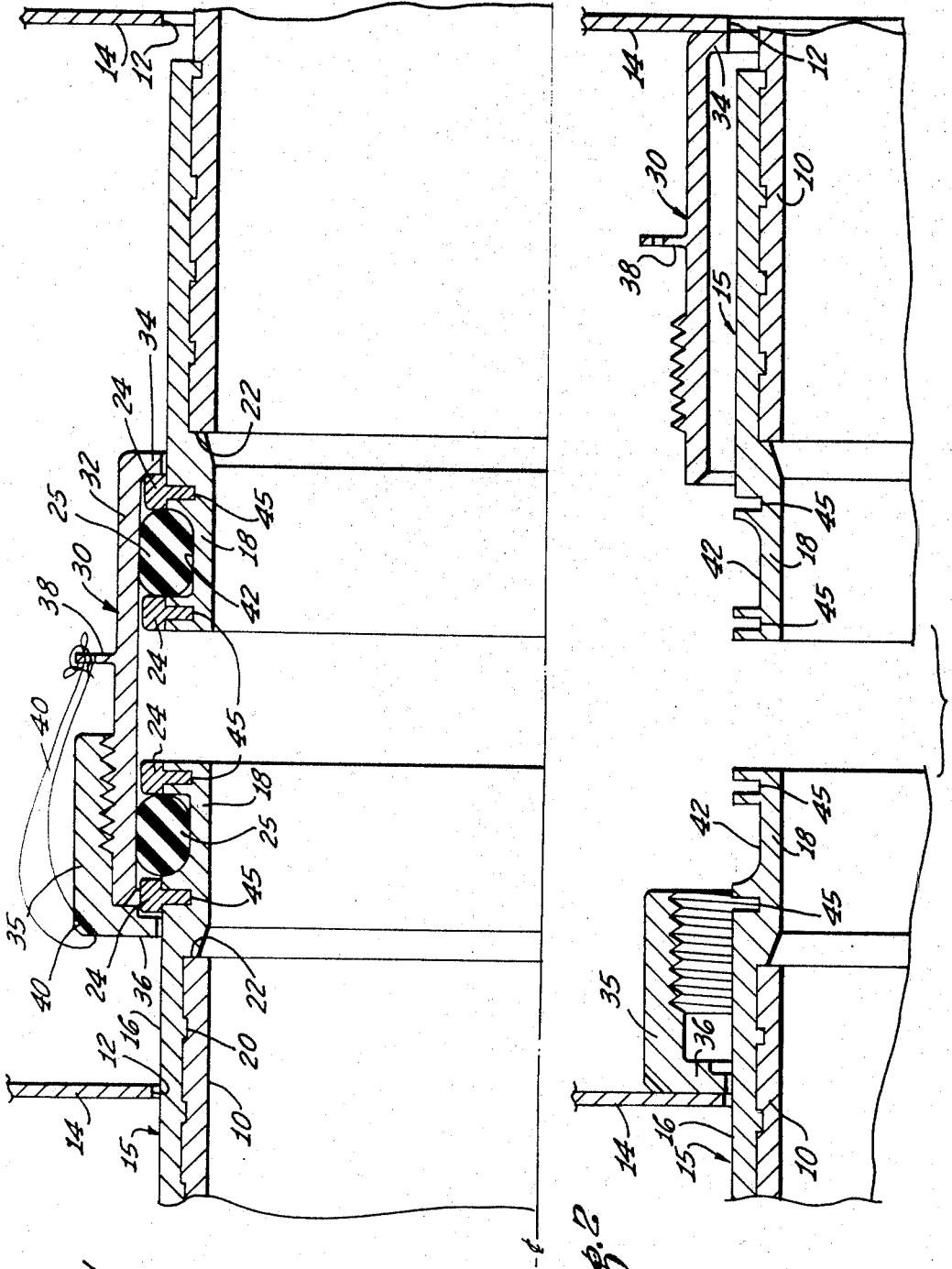

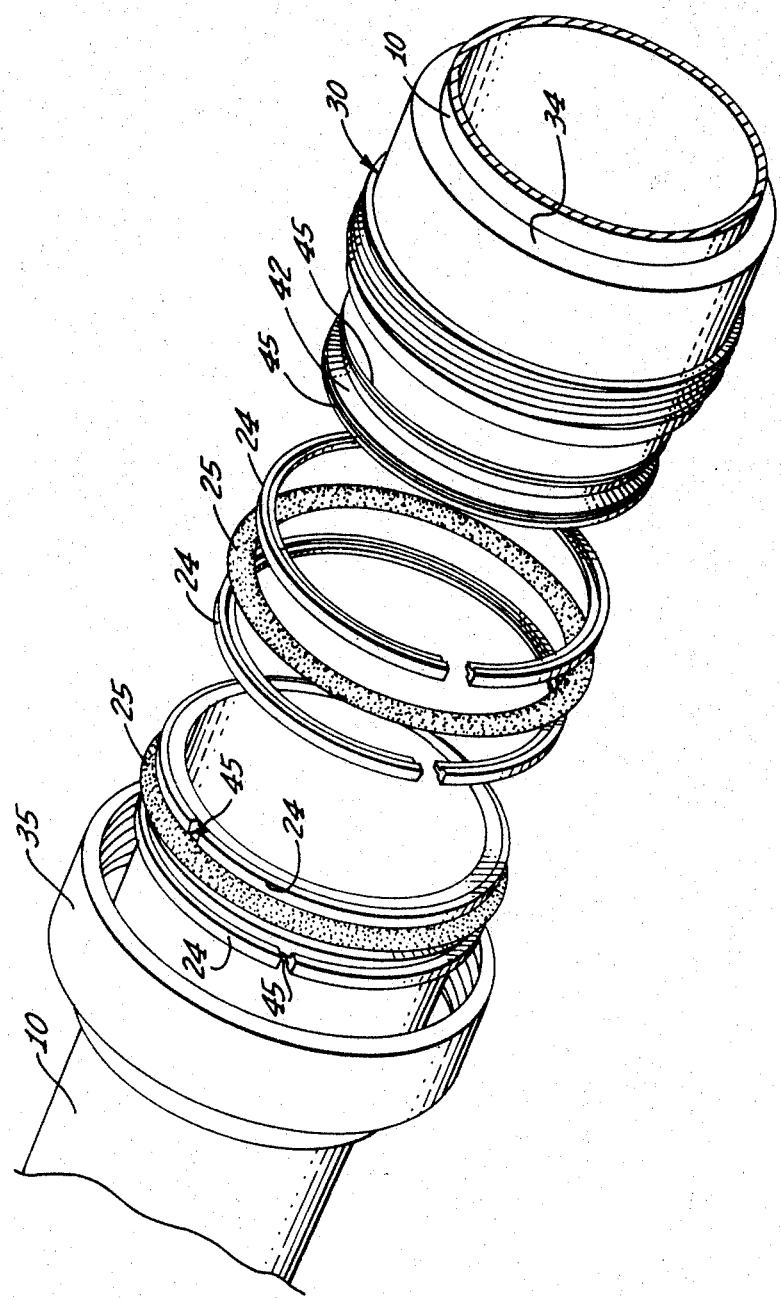

ABSTRACT OF THE DISCLOSURE

A coupling for interconnecting two confronting tube ends of the type wherein each tube end has two spaced radial flanges to confine an O-ring and the four radial flanges are surrounded and captivated by a cylindrical coupling body made of separable parts. The invention teaches that the overall diameter of the assembled coupling may be minimized with the radial flanges in the form of split rings that may be removed temporarily to permit the two tube ends to be extended through bulkhead openings of substantially less diameter than the outside diameter of the assembled coupling.

BACKGROUND OF THE INVENTION

The invention relates to a coupling of the type that is disclosed, for example, in the DeCenzo Patent 3,223,438. In such a coupling each of the two confronting tube ends has two spaced radial flanges to confine an O-ring and the two tube ends are bridged by a cylindrical coupling body made of separable parts. The coupling body encloses the series of four radial flanges and engages the two flanges at the two opposite ends respectively of the series to prevent separation of the two tube ends.

The DeCenzo patent teaches that where thin walled tubing is used the radial flanges may be provided by making outwardly extending circumferential folds in the wall of the tubing. DeCenzo also teaches that a ferrule may be telescoped over the end of a thin walled tube with the ferrule providing at least one of the two radial flanges. Thin walled tubing is commonly employed in aircraft where reduction in weight is an important objective and ferrules provide added strength where tubes are interconnected by couplings.

One of the problems solved by the present invention is to reduce the weight of a whole tubing installation and a related problem is to reduce the outside diameter of an assembled coupling.

Other problems which relate to the configuration of the ferrule are to prevent damage to the sealing surfaces of the ferrule by the operation of swaging the tubing and to facilitate withdrawal of the swaging dies after a swaging operation. A further problem met by the invention is to make it possible to pass the tube ends through bulkhead openings of substantially less diameter than the outside diameter of the assembled coupling and a related problem is to eliminate captivity by the tube ends of the separable parts of the cylindrical coupling body that encloses the radial flanges.

SUMMARY OF THE INVENTION

The invention includes a ferrule telescoped over each of the two confronting ends of the thin walled tubes with each tube swaged outwardly into effective engagement with its ferrule. Thus each ferrule may be regarded as a unitary part of a tube end. An important feature of the invention is that the ferrule is divided into a relatively thin rearward portion to which the thin walled tube is swaged and a forward relatively thick portion that extends beyond the tube end and is adapted to seat the corresponding O-ring. The ferrule is of substantially uniform outside diameter but the relatively thick forward portion has substantially the same inside diameter as the thin walled tube.

This arrangement spaces the O-ring seat away from the zone of the swaging operation and thus solves the problem of preventing the swaging operation from damaging the O-ring seat. Since the inside diameter of the forward portion of the ferrule is substantially the same as the inside diameter of the thin walled tube or, in any event not substantially smaller than the inside diameter of the thin walled tube, and since the outside diameter of the ferrule is in effect substantially uniform, it is not necessary to employ swaging dies of stepped configuration. Thus the invention solves the problem of making it easy to withdraw the swaging dies.

Another feature of the preferred embodiment of the invention is that the relatively thick forward portion of the ferrule is formed with a relatively wide circumferential groove to seat the O-ring. In the preferred embodiment of the invention the diameter of the bottom of the circuferential groove is substantially equal to the outside diameter of the thin walled tubing. The advantage of this feature may be appreciated when it is considered that if the portion of the ferrule that is telescoped over a thin walled tubing carries the O-ring, then the inside diameter of the O-ring must be spaced radially outwardly from the thin walled tube by the thickness of the ferrule. Thus the present invention makes it possible to use a high strength ferrule without the penalty of increasing the diameter of the O-ring by twice the thickness of the ferrule. With the diameter of the O-ring reduced, the outside diameter of the radial flanges of the ferrule may be correspondingly reduced and, of course, the diameter of the cylindrical coupling body may be reduced accordingly. Thus making it possible to reduce the diameter of the O-ring results in substantial reduction in the outside diameter of the coupling assembly as well as substantial reduction in the overall weight of the coupling assembly.

A still further advantage of the new ferrule configuration is that with the provision of an outer circumferential groove to seat the inner circumferential portion of the O-ring, the radial flanges of the ferrule that are located on opposite sides of the groove for the purpose of confiining the O-ring may be of relatively small radial dimension because only part of the O-ring extends radially outward from the outer cylindrical surface of the ferrule.

A further feature of the invention is the concept of providing the ferrule with removable radial flanges for confining the O-ring. In the preferred embodiment of the invention the two radial flanges are in the form of split rings that seat in narrow outer circumferential grooves on opposite sides of the relatively wide groove that seats the O-ring. One advantage of this construction is that with the split rings temporarily removed from a tube end, a separated part of the cylindrical coupling body, for example a part in the form of a nut that provides one of the radially inward flanges of the coupling body, may be passed over the tube end. Thus this feature of the invention solves the problem of avoiding captivity of the separable parts of the coupling body.

The removability of the radial flanges of the ferrule together with the reduction in outside diameter of the coupling parts makes it feasible to run the thin walled tubes through bulkhead openings that are of smaller diameter than heretofore possible. The fixed radial flanges of the prior art and the resulting captivity of the separable parts of the cylindrical coupling body require that the diameter of the bulkhead openings exceed the outside diameter of the assembled coupling body with the consequence that the thin walled tubing extends through the bulkhead opening with excessive radial clearance. Reinforcement plates commonly termed doublers are used to seal off the radial clearance at the bulkhead openings and the present invention in reducing the clearance permits the use of doublers of greatly reduced size with corresponding substantial saving in weight over the whole tubing system of an aircraft.

The features and advantages of the invention may be understood by reference to the following description and the accompanying drawings.

BRIEF DESCRIPTION OF THE DRAWINGS

In the drawings, which are to be regarded as merely illustrative:

FIG. 1 is a fragmentary longitudinal view showing two ends of thin walled tubes extending through two relatively closely spaced bulkhead openings with the two tube ends interconnected by a coupling construction in accord with the teachings of the invention;

FIG. 2 is a view similar to FIG. 1 showing the two tube ends extending through the two bulkheads prior to the assembly of the coupling; and FIG. 3 is a perspective view of the parts of the coupling with two of the split rings and an O-ring separated from the remainder of the assembly.

DESCRIPTION OF THE PREFERRED EMBODIMENT

FIG. 1 shows the ends of two thin walled tubes 10 extending through two corresponding openings 12 in two bulkheads 14 with the two tube ends interconnected by the presently preferred embodiment of the new coupling. Each of the two tube ends 10 is provided with a ferrule, generally designated 15, which has a relatively thin rearward portion 16 telescoped over the tube end and a relatively thick forward portion 18 extending beyond the tube end. The rearward portion 16 of the ferrule has an irregular inner circumferential surface and the tube 10 is swaged outwardly into engagement with the irregular surface. In this instance, the inner circumferential surface of the ferrule is formed with a series of spaced ribs or lands 20.

The forward portion 18 of the ferrule is of the same outside diameter as the rearward portion 16 but is of substantially less inside diameter to provide the greater radial thickness. In this instance the inside diameter of the forward portion 18 is substantially the same as the inside diameter of the tube 10. The increased thickness of the forward portion 18 forms an inner circumferential shoulder 22 which serves as a stop for abutment by the end of the tube 10.

Each of the two ferrules 15 is provided with a pair of spaced radial flanges 24 confining an O-ring 25 and in the assembled coupling, the four flanges are enclosed and captivated by a cylindrical coupling body, generally designated 30, which is made in two separable parts. In the construction shown, one part of the coupling body 30 is a cylinder 32 having a radially inward end flange 34 to overhang and engage an endmost radial flange 24 and the other part of the coupling body is a nut 35 which screws onto the cylinder 32 and which is formed with a second radially inward end flange 35 to overhang and engage the other endmost radial flange 24. In a well known manner, the cylinder 32 may be provided with an integral apertured ear 38 and the nut 35 may be provided with an inclined bore 40 to permit the ear and coupling to be interconnected by a twisted wire 40 for the purpose of preventing unloosening of the nut.

The forward portion 18 of each of the ferrules 15 is formed with a relatively wide outer circumferential groove 42 to seat the corresponding O-ring 25, the groove being flanked by the two radial flanges 24 of the ferrule. In accord with the teachings of the invention, the two radial flanges 24 of the ferrule are in the form of split rings which removably seat in two corresponding narrow grooves 45 in the ferrule, the side walls of the grooves forming shoulders to confine the split rings against axial movement. In the construction shown, each of the split rings 24 is advantageously of T-shaped configuration. In the preferred embodiment of the invention the diameter of the bottom of the groove 42 is approximately the outside diameter of the corresponding tube 10 or a little less. In the assembled coupling shown in FIG. 1, the groove 42 confines approximately the inner half of the radial cross section of the O-ring so that the radial flanges or split rings 24 of the ferrule need protrude radially only sufficiently to confine the remaining half of the cross section of the O-ring. Thus the provision of the groove 42 makes it possible to minimize the radial dimension of the flanges that are formed by the split rings.

In the course of an the installation of a tubing system in an aircraft, the tube ends 10 without the split rings 24 and without the O-rings 25 are inserted through the bulkhead openings and when two tube ends are so inserted through two closely spaced bulkheads, the separable parts of the coupling body 30 are held in position between the two bulkheads for the tube ends to enter the coupling parts. Thus FIG. 2 shows one tube end 10 inserted through the right hand bulkhead with the cylindrical part 30 of the coupling body surrounding the advanced tube end. In like manner FIG. 2 shows the other tube end extended through the separated nut 40 of the coupling body. When the two confronting tube ends are completely installed, they are at fixed spacing, the spacing being sufficiently small to permit the tubing ends to be interconnected by the assembled coupling body.

With the parts positioned as shown in FIG. 2, it is a simple matter to introduce the four split rings 24 and the two O-rings 25 successively into the space between the confronting tube ends so that the split rings and O-rings may be assembled in succession to the two ferrules. After the split rings and O-rings are assembled, it is a simple matter to bring the nut 40 and the cylinder 32 together to permit the nut to be threaded onto the cylinder to complete the assembly of the coupling. The wire 40 may then be installed to prevent loosening rotation of the nut 40 relative to the cylinder 32.

It is apparent from the foregoing description that for tubing of a given size, the bulkhead openings 12 may be of smaller diameter than heretofore possible. It is also apparent that the grooves 42 in the two ferrules make it possible to use O-rings of relatively small diameter and thus make it possible to reduce the overall diameter of the coupling for substantial saving in weight. It is further apparent that since the clearance space between the installed tubing and each of the bulkhead openings is relatively small, relatively small reinforcement plates or doublers may be used to seal or close the clearance spaces and the reduced size of the reinforcement plates or doublers result in further weight saving.

My description in specific detail of the preferred embodiment of the invention will suggest various changes, substitutions and other departures from my description. For example, the relatively wide groove 42 in a ferrule may be omitted, the O-ring then seating on the outer cylindrical surface of the ferrule.

I claim:

1. In a coupling for interconnecting two confronting tube ends wherein each tube end has two spaced outer circumferential flanges secured thereto with an elastomer sealing ring confined between the two flanges and wherein cylindrical means made in separable parts bridges the two coupling ends with an inner cylindrical surface of one of the separable parts enclosing the series of four flanges as well as the two sealing rings so that the two sealing rings block all leakage paths into and out of the two tubing ends with the cylindrical means engaging the two flanges at the opposite ends respectively of the series to prevent separation of the two tube ends, said tube ends, flanges and sealing rings being free to telescope within said inner cylindrical surface, the improvement comprising:

said four flanges being in the form of split rings; and
said tube ends having outer circumferential shoulders for releasable engagement by the split rings, said shoulders being integral with the tube ends and extend radially inwardly from the outer surface of the tube ends,
whereby the tube ends may be passed through bulkhead openings of smaller diameter than the outside diameter of the flanges and then the split rings, elastomer sealing rings and the cylindrical means may be assembled to complete the coupling.

2. An improvement as set forth in claim 1 in which said outer circumferential shoulders of the tube ends are formed by two spaced outer circumferential grooves in each tube end and the split rings releasably seat in said grooves.

3. An improvement as set forth in claim 2 in which each of said split rings is T-shaped in cross-sectional configuration.

4. An improvement as set forth in claim 2 in which each of said tube ends is formed with a wider groove between the two spaced grooves to seat one of the two elastomer sealing rings, the two split rings serving in effect to increase the depth of said wider groove to accommodate the radial dimension of the elastomer sealing ring.

5. In a coupling for interconnecting two confronting ends of thin walled tubes in an installation where the two tube ends extend through openings in two bulkheads respectively into a space between the two bulkheads, wherein two ferrules fixedly embrace the two tube ends respectively in a fluid tight manner and each ferrule has two spaced outer circumferential flanges secured thereto with an elastomer sealing ring confined between the flanges and wherein cylindrical means made in separable parts bridges the two tube ends with an inner cylindrical surface of one of the separable parts enclosing the series of four flanges as well as the two sealing rings so that the two sealing rings block all leakage paths into and out of the two tubing ends with the cylindrical means engaging the two flanges at the two opposite ends respectively of the series to prevent separation of the two tube ends, said tube ends, flanges and sealing rings being free to telescope with the inner cylindrical surface,
the improvement to permit dimensioning of the bulkhead openings to a given diameter less than the outside diameter of said four flanges, comprising:
each of said ferrules having an outside diameter less than said given diameter to permit the two ferrules to pass through the two bulkhead openings respectively,
each of said ferrules having two outer circumferential grooves spaced apart in accord with the width of the corresponding sealing ring; and
two retaining rings seated in the two outer circumferential grooves of each ferrule to form the two flanges of the ferrule,
said retaining rings being of split construction to permit the retaining rings to be assembled to the ferrules after the ferrules pass through the corresponding bulkhead openings.

6. An improvement as set forth in claim 5 in which each of said ferrules has a third wider groove between the two grooves that seat the two retaining rings, said wider groove being dimensioned to seat the inner circumferential portion of a sealing ring whereby the retaining rings need be dimensioned radially to confine only the outer circumferential portion of the sealing ring.

7. An improvement as set forth in claim 5 in which each of said ferrules has a rearward portion telescoped over the corresponding end of the thin walled tube and has a forward portion of lesser inside diameter than the rearward portion lying beyond the end of the thin walled tube:
said forward portion being of greater radial dimension than the rearward portion and being formed with the two outer circumferential grooves that seat the two retaining rings.

8. An improvement as set forth in claim 7 in which said forward portion of the ferrule has a groove between the two first-mentioned grooves to seat the sealing ring.

9. An improvement as set forth in claim 8 in which rearward and forward portions of the ferrule are of substantially the same outside diameter.

10. An improvement as set forth in claim 9 in which said forward portion of the ferrule abuts the end of the tube and said rearward portion of the ferrule has an irregular inner circumferential surface with the tube swaged outwardly into engagement with the irregular surface.

References Cited

UNITED STATES PATENTS

| | | | |
|---|---|---|---|
| 2,641,012 | 6/1953 | Storrs | 285—379 X |
| 2,786,696 | 3/1957 | Feldmeier | 285—379 X |
| 2,826,437 | 3/1958 | Detweiler et al. | 285—233 |
| 2,918,313 | 12/1959 | Lazar et al. | 285—233 X |
| 3,186,739 | 6/1965 | Mahoff et al. | 285—347 X |
| 3,198,559 | 8/1965 | Snyder | 285—233 |

FOREIGN PATENTS

| | | |
|---|---|---|
| 883,640 | 3/1943 | France. |
| 565,387 | 11/1944 | Great Britain. |
| 1,046,601 | 10/1966 | Great Britain. |

THOMAS CALLAGHAN, *Primary Examiner.*

U.S. Cl. X.R.

285—379, 415; 277—187; 285—382.4